United States Patent
Wang et al.

(10) Patent No.: US 11,205,046 B2
(45) Date of Patent: Dec. 21, 2021

(54) TOPIC MONITORING FOR EARLY WARNING WITH EXTENDED KEYWORD SIMILARITY

(71) Applicant: PING AN TECHNOLOGY (SHENZHEN) CO., LTD., Shenzhen (CN)

(72) Inventors: Jianzong Wang, Shenzhen (CN); Zhangcheng Huang, Shenzhen (CN); Tianbo Wu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 629 days.

(21) Appl. No.: 16/090,351

(22) PCT Filed: Jun. 28, 2017

(86) PCT No.: PCT/CN2017/090579
§ 371 (c)(1),
(2) Date: Oct. 1, 2018

(87) PCT Pub. No.: WO2018/184306
PCT Pub. Date: Oct. 11, 2018

(65) Prior Publication Data
US 2021/0224481 A1    Jul. 22, 2021

(30) Foreign Application Priority Data

Apr. 7, 2017    (CN) .......................... 201710225685.3

(51) Int. Cl.
*G06F 40/247*    (2020.01)
*G06F 40/284*    (2020.01)
*G06F 40/30*    (2020.01)

(52) U.S. Cl.
CPC .................................. *G06F 40/284* (2020.01)

(58) Field of Classification Search
CPC ...... G06F 40/20; G06F 40/237; G06F 40/247; G06F 40/279; G06F 40/284; G06F 40/30
(Continued)

(56) References Cited

U.S. PATENT DOCUMENTS 9,892,103 B2 *  2/2018 Manolescu ........... G06F 40/169
10,394,953 B2 *  8/2019 Satyavarta .............. G06F 40/30
(Continued)

FOREIGN PATENT DOCUMENTS

CN        101295319 A      10/2008
CN        101751458 A       6/2010
(Continued)

OTHER PUBLICATIONS

International Search Report for International Application No. PCT/CN2017/090579 dated Jan. 11, 2018.
(Continued)

*Primary Examiner* — Martin Lerner
(74) *Attorney, Agent, or Firm* — Marcus S. Simon

(57) ABSTRACT

A method for topic early warning includes: acquiring a self-defined keyword; calculating similarity between the self-defined keyword and each word in a corpus, and acquiring extended keywords related to the self-defined keyword from the corpus according to the similarity; selecting a target keyword from the extended keywords according to a type of the extended keywords and similarity between the extended keywords and the self-defined keyword, and adding the target keyword to a target keyword list; performing real-time monitoring according to the target keyword in the target keyword list; and performing topic early warning when it is monitored that the number of topics corresponding to the target keyword reaches a preset threshold.

15 Claims, 8 Drawing Sheets

(58) Field of Classification Search
USPC .......... 704/9, 255, 1, 10; 707/738, 765, 767
See application file for complete search history.

(56) References Cited

U.S. PATENT DOCUMENTS

| | | | |
|---|---|---|---|
| 10,558,740 B1* | 2/2020 | O'Malley | G06F 40/30 |
| 2006/0212288 A1* | 9/2006 | Sethy | G06F 40/216 |
| | | | 704/10 |
| 2008/0208840 A1* | 8/2008 | Zhang | G06F 40/295 |
| 2009/0157389 A1* | 6/2009 | Shaw | G06F 40/279 |
| | | | 704/9 |
| 2010/0119053 A1 | 5/2010 | Goeldi | |
| 2010/0185689 A1* | 7/2010 | Hu | G06F 40/289 |
| | | | 707/803 |
| 2011/0004465 A1* | 1/2011 | Rose | G06F 40/284 |
| | | | 704/9 |
| 2011/0276396 A1 | 11/2011 | Rathod | |
| 2013/0151525 A1* | 6/2013 | Ankan | G06F 40/30 |
| | | | 707/737 |
| 2015/0213002 A1* | 7/2015 | Gou | G06F 40/30 |
| | | | 704/9 |
| 2015/0286627 A1* | 10/2015 | Chang | G06F 40/30 |
| | | | 704/9 |
| 2016/0034571 A1* | 2/2016 | Setayesh | G06F 40/30 |
| | | | 707/738 |
| 2016/0062967 A1* | 3/2016 | Cantarero | G06F 40/30 |
| | | | 715/230 |
| 2017/0004129 A1* | 1/2017 | Shalaby | G06F 40/30 |
| 2017/0039290 A1* | 2/2017 | Bobick | G06F 40/247 |
| 2017/0213138 A1* | 7/2017 | Bojja | G06F 40/20 |
| 2017/0270098 A1* | 9/2017 | Liu | G06F 40/30 |
| 2017/0293686 A1* | 10/2017 | Bingol | G06F 40/284 |
| 2017/0315987 A1* | 11/2017 | Srinivasan | G06F 40/30 |
| 2018/0089715 A1* | 3/2018 | Ken-Dror | G06F 40/30 |

FOREIGN PATENT DOCUMENTS

| | | |
|---|---|---|
| CN | 102194001 A | 9/2011 |
| CN | 102195899 A | 9/2011 |
| CN | 103268350 A | 8/2013 |
| CN | 103853720 A | 6/2014 |
| CN | 104281607 A | 1/2015 |
| CN | 104408157 A | 3/2015 |
| CN | 104516903 A | 4/2015 |
| CN | 104573008 A | 4/2015 |
| CN | 104915405 A | 9/2015 |
| CN | 104933183 A | 9/2015 |
| CN | 105045875 A | 11/2015 |
| TW | 200719172 A | 5/2007 |
| TW | 201324199 A | 6/2013 |

OTHER PUBLICATIONS

Jing, Wang, "Research on Key Technologies of Massive Data Retrieval Model for Internet Public Opinion Analysis", http://cdmd.cnki.com.com.cn/Article/CDMD-10028-1013291841.htm; Capital Normal University, 2013, 10 pages.

China Academic Journal, "Study on Application of Ontology in Online Public Opinion Analysis System", Jan. 31, 2014, 5 pages.

China Machine Press, "Basic Principles of Sequential Data Processing", Oct. 31, 2015, 5 pages.

Li, Wang, "Research and Application of Information Extraction Based on Query Expansion", Jun. 15, 2012, 5 pages.

Chinese Master's Theses, Full-Text Database, "Key Technologies of Massive Data Retrieval Model for Internet Public Opinion Analysis", Feb. 15, 2014, 7 pages.

Li, Wang, "Research and Application of Information Extraction Based on Query Expansion", Nov. 14, 2011, 5 pages.

Tsinghua University Press, "Simple but Profound Mega Data", Mar. 31, 2016, 6 pages.

* cited by examiner

TOPIC MONITORING FOR EARLY WARNING WITH EXTENDED KEYWORD SIMILARITY

CROSS REFERENCE TO RELATED APPLICATIONS

This application is a U.S. national stage of PCT International Application No. PCT/CN2017/090579, filed on Jun. 28, 2017, which claims priority of Chinese Patent Application No. 2017102256853, titled "METHOD AND APPARATUS FOR TOPIC EARLY WARNING" and filed on Apr. 7, 2017. The entireties of both applications are incorporated by reference herein for all purposes.

TECHNICAL FIELD

The present disclosure relates generally to the field of computer processing, and more particularly, to a method, an apparatus, a computer equipment and a storage medium for topic early warning.

BACKGROUND

With the development of social media, social websites, online communities and microblogs have gradually become an indispensable part of people's lives, and are also the main channels for information dissemination in modern age. At the same time, social media is also an important way for spreading public opinions. It may provide scientific information support for decision makers by monitoring a social medium topic and performing early warning. The traditional monitoring and early warning of social medium topics is to analyze the acquired historical data and then perform label grading to the different topics. Since the topic update speed is very fast, the results merely obtained from the analysis of historical data are not accurate enough obviously. Moreover, the traditional topic monitoring is to monitor all topics without considering users' personalized needs.

SUMMARY

According to various embodiments of the present application, a method, an apparatus, a computer equipment and a storage medium for topic early warning are provided.

A method for topic early warning includes:
acquiring a self-defined keyword;
calculating similarity between the self-defined keyword and each word in a corpus, and acquiring extended keywords related to the self-defined keyword from the corpus according to the similarity;
selecting a target keyword from the extended keywords according to a type of the extended keywords and similarity between the extended keywords and the self-defined keyword, and adding the target keyword to a target keyword list;
performing real-time monitoring according to the target keyword in the target keyword list; and
performing topic early warning when it is monitored that the number of topics corresponding to the target keyword reaches a preset threshold.

An apparatus for topic early warning includes:
a self-defined keyword acquiring module, configured to acquire a self-defined keyword;
an extended keyword acquiring module, configured to calculate similarity between the self-defined keyword and each word in a corpus, and acquire extended keywords related to the self-defined keyword from the corpus according to the similarity;
a target keyword selecting module, configured to select a target keyword from the extended keywords according to a type of the extended keywords and similarity between the extended keywords and the self-defined keyword, and add the target keyword to a target keyword list;
a monitoring module, configured to perform real-time monitoring according to the target keyword in the target keyword list;
and
an early warning module, configured to perform topic early warning when it is monitored that the number of topics corresponding to the target keyword reaches a preset threshold.

A computer equipment includes a memory, a processor and a computer-readable instruction stored on the memory. When the computer-readable instruction is executed by the processor, the processor is caused to execute following steps:
acquiring a self-defined keyword;
calculating similarity between the self-defined keyword and each word in a corpus, and acquiring extended keywords related to the self-defined keyword from the corpus according to the similarity;
selecting a target keyword from the extended keywords according to a type of the extended keywords and similarity between the extended keywords and the self-defined keyword, and adding the target keyword to a target keyword list;
performing real-time monitoring according to the target keyword in the target keyword list; and
performing topic early warning when it is monitored that the number of topics corresponding to the target keyword reaches a preset threshold.

One or more non-volatile computer-readable storage medium(s) with computer-readable instructions stored thereon, when the computer-readable storage medium is executed by one or more processors, the one or more processors are caused to execute the following steps:
calculating similarity between the self-defined keyword and each word in a corpus, and acquiring extended keywords related to the self-defined keyword from the corpus according to the similarity;
selecting a target keyword from the extended keywords according to a type of the extended keywords and similarity between the extended keywords and the self-defined keyword, and adding the target keyword to a target keyword list;
performing real-time monitoring according to the target keyword in the target keyword list; and
performing topic early warning when it is monitored that the number of topics corresponding to the target keyword reaches a preset threshold.

The details of one or more embodiments of the subject matter described in the present disclosure are set forth in the accompanying drawings and the description below. Other features, objectives, and advantages of the present disclosure will become apparent from the description, the drawings, and the claims.

BRIEF DESCRIPTION OF THE DRAWINGS

To illustrate the technical solutions in the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the objectives, technical solutions, and advantages of the present disclosure more clear to understand, the following further describes the present invention in detail with reference to the accompanying drawings and embodiments. It should be appreciated that the specific embodiments described herein are only used to explain the present disclosure and are not used to limit the present disclosure.

Figure 1:
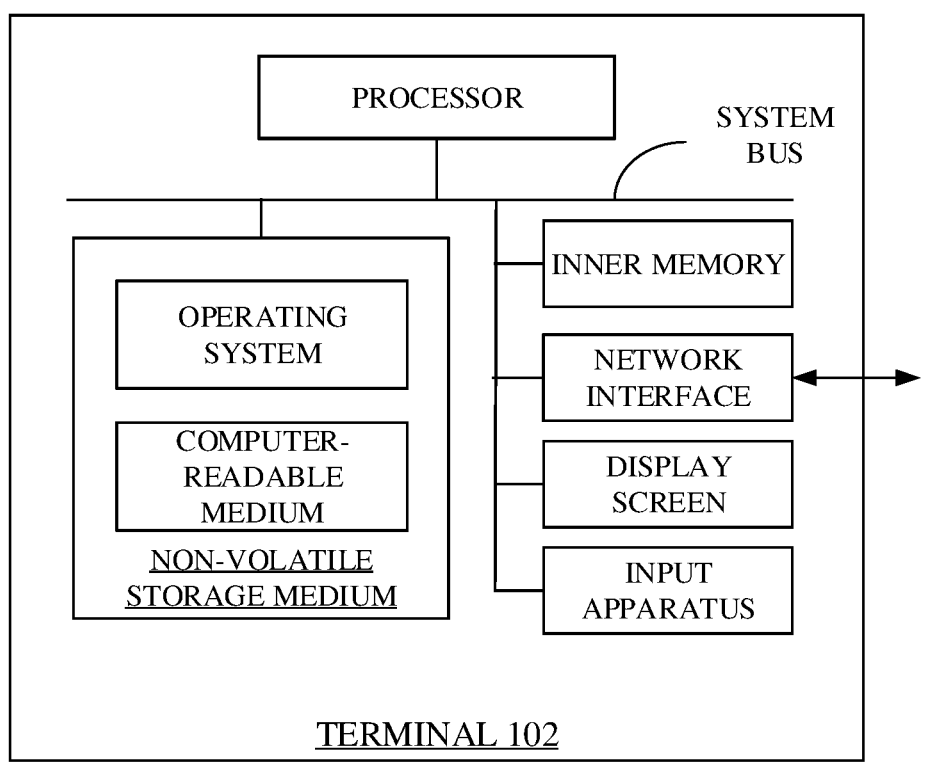
FIG. 1 is a block diagram illustrating internal structure of a terminal according to one embodiment.

As shown in FIG. 1, in one embodiment, the internal structure of a terminal 102 is shown in FIG. 1. The terminal 102 includes a processor connected via a system bus, a non-volatile storage medium, an internal memory, a network interface, a display screen, and an input apparatus. The processor of the terminal 102 is used to provide computing and control capabilities to support the operation of the entire terminal 102. The non-volatile storage medium stores operating systems and computer-readable instructions, and the computer-readable instructions are executable by the processor to implement a method for topic early warning that is applicable to the terminal 102. The internal memory in the terminal 102 provides an environment for an operation of the operating system and the computer-readable instructions in the non-volatile storage medium. The network interface is used to connect to the network for communication. The display screen of the terminal 102 may be a liquid crystal display screen or an electronic ink display or the like. The input apparatus may be a touch layer covered on the display screen, a button, a trackball or a touchpad provided on a housing of the electronic device, or an external keyboard, an external touchpad or an external mouse or the like. The terminal 102 may be a tablet, a laptop, a desktop computer or the like. Those skilled in the art may understand that the structure shown in FIG. 1 is merely a block diagram of a part of the structure related to the solution of the present application, and does not constitute the limitation on the terminal to which the solution of the present application is applied. A particular terminal may include more or fewer components than the one shown in the drawings, or some components may be combined or have different component arrangements.

Figure 2:
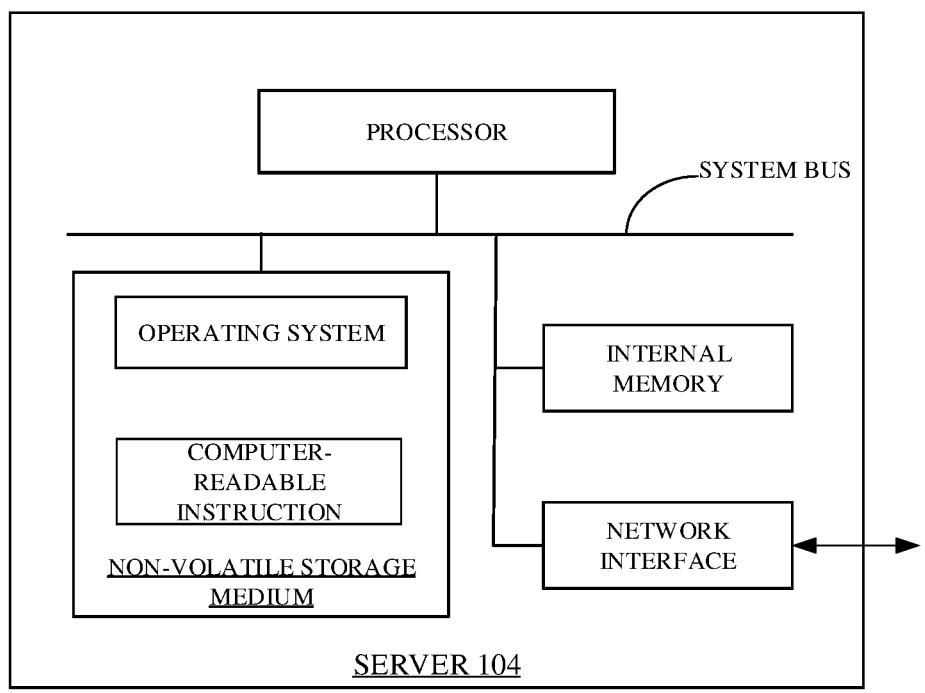
FIG. 2 is a block diagram illustrating internal structure of a server according to one embodiment.

As shown in FIG. 2, in one embodiment, the internal structure of a server 104 is shown in FIG. 2. The server 104 includes a processor connected via a system bus, a non-volatile storage medium, an internal memory and a network interface. The processor of the server 104 is used to provide computing and control capabilities to support the operation of the entire server 104. The non-volatile storage medium stores operating systems and computer-readable instructions. The computer-readable instructions are executable by the processor to implement a method for topic early warning applicable to the server 104. The internal memory of the server 104 provides an environment for an operation of the operating system and the computer-readable instructions in the non-volatile storage medium. The network interface of the server is used to communicate with an external server and the terminal through a network connection. Those skilled in the art may understand that the structure shown in FIG. 2 is merely a block diagram of a part of the structure related to the solution of the present application, and does not constitute the limitation on the server to which the solution of the present application is applied. A particular server may include more or fewer components than the one shown in the drawings, or some components may be combined or have different component arrangements.

Figure 3:
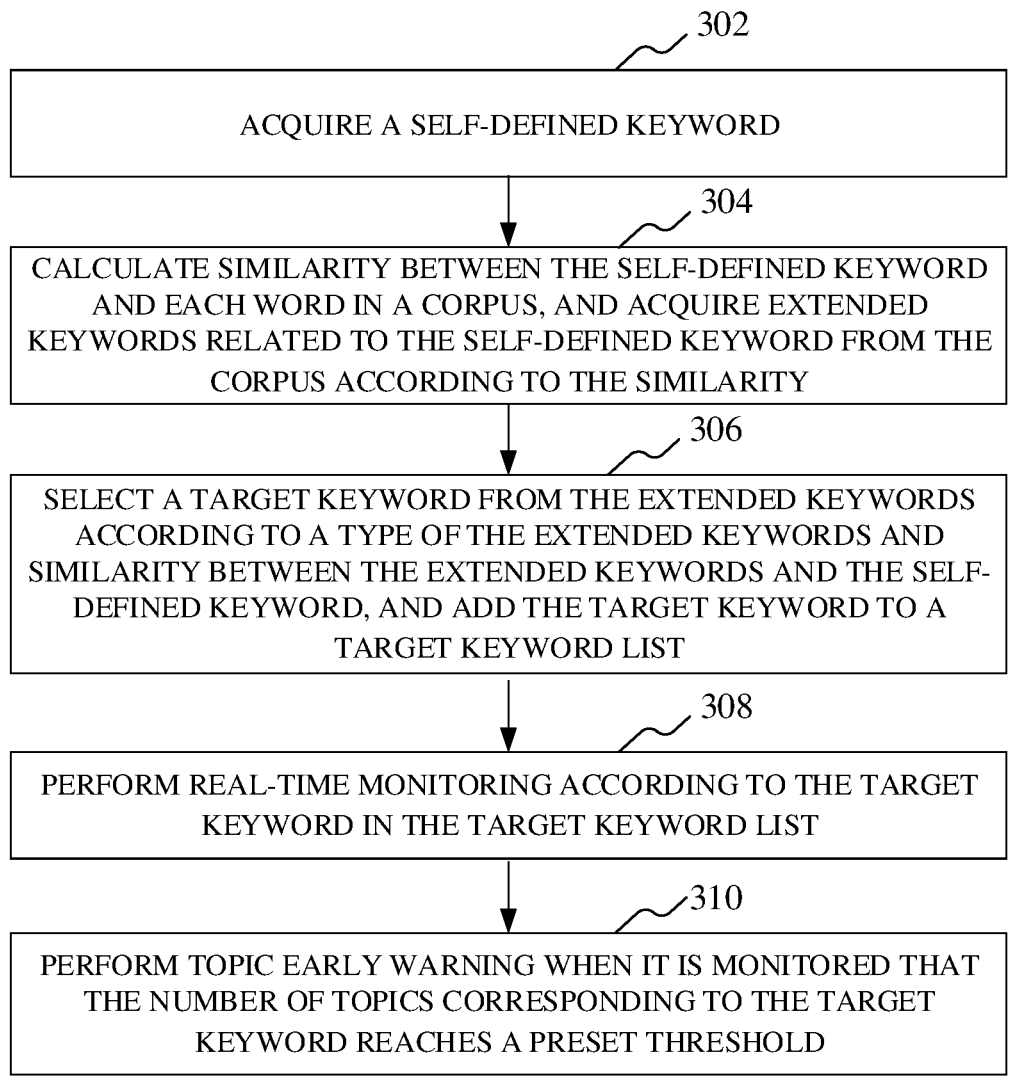
FIG. 3 is a flow diagram illustrating a method for topic early warning according to one embodiment.

As shown in FIG. 3, in one embodiment, a method for topic early warning is provided. The method may be applied to a computer equipment. The computer equipment may be a terminal or a server, and the method specifically includes the following steps:

Step 302, acquire a self-defined keyword.

In the present embodiment, the self-defined keyword refers to a keyword given by the user that meets the user's monitoring needs. In order to satisfy the user's personalized monitoring needs, the settings of the keyword for monitoring is set according to the user self-defined keyword. In the age of big data, the social media information is complex with various subjects, and different users have different topics of concern, in which the topic refers to the subject of a discussion. Since different people concerns different subjects, by using the self-defined keyword, it not only brings the friendly user interaction, but also realizes personalization and diversification of the user's monitoring needs.

Step 304, calculate similarity between the self-defined keyword and each word in a corpus, and acquire extended keywords related to the self-defined keyword from the corpus according to the similarity;

In the present embodiment, since the self-defined keyword given by the user is often incomplete and not comprehensive, it is necessary to make certain extensions to the self-defined keyword. Acquiring the extended keywords related to the self-defined keyword helps to ensure that the topic that the user needs to monitor is more comprehensive and complete, and thus the integrity and diversity of the monitoring result are ensured. By calculating the similarity between the self-defined keyword and each word in the corpus, the words with high similarity with the self-defined keyword are selected from the corpus as the extended keywords. The greater the similarity, the closer the semantics of the word to the self-defined keyword is. There are many ways to calculate the similarity between words. For example, the similarity between words may be calculated by using the synonym word forest, and the Pearson Correlation Coefficient may also be used to calculate the similarity between words. The calculation method of the word similarity is not limited here.

In one embodiment, the calculation of the similarity is obtained by calculating similarity between word vectors. Firstly, a word vector corresponding to the self-defined keyword is calculated by using the word2vec model. The word2vec is an efficient tool for characterizing a word as a real-valued vector. With the use of the idea of deep learning, the processing of text content can be simplified to vector operations in a k-dimensional vector space through training, and the similarity in the vector space can be used to represent the semantic similarity of the text. Specifically, the self-defined keyword is used as an input of the word2vec model, and the word vector representation of the self-defined keyword is output. After the word vector representation of the self-defined keyword is acquired, the extended keywords of the self-defined keyword are selected from the corpus by calculating the similarity between the word vectors. In order to acquire the extended keywords related to the self-defined keyword more quickly, the words in the corpus may all be stored in the form of word vectors. In one embodiment, the Pearson Correlation Coefficient is used to calculate the similarity between word vectors. Assuming that the vector of the self-defined keyword is represented as $W=(w_1, w_2, L, w_n)$, and the vector of any one of the words in the corpus is represented as $X=(x_1, x_2, L, x_n)$, the similarity $s(W, X)$ between them is:

$$s(W, X) = \frac{n\sum_{i=1}^{n} w_i x_i - \sum_{i=1}^{n} w_i \sum_{i=1}^{n} x_i}{\sqrt{n\sum_{i=1}^{n} w_i^2 - (\sum_{i=1}^{n} w_i)^2} \cdot \sqrt{n\sum_{i=1}^{n} x_i^2 - (\sum_{i=1}^{n} x_i)^2}},$$

wherein n represents the n-th word vector feature of the word vector, and i represents the i-th word vector feature of the word vector. The extended keywords related to the self-defined keyword are selected by calculating the similarity between the self-defined keyword and each word in the corpus. Specifically, the similarity may be ranked in a descending order, and the top k words having the highest similarity are selected as the extended keywords of the self-defined keyword. Extending the self-defined keywords makes the keyword more diverse, and the comparison between the topic monitoring results and the similar keywords is ensured, which contributes to provide decision makers with richer information.

Step 306: select a target keyword from the extended keywords according to a type of the extended keywords and similarity between the extended keywords and the self-defined keyword, and add the target keyword to a target keyword list.

In the present embodiment, if all of the extended keywords obtained in step 204 are monitored, the information will be confusing and disorderly. Therefore, in order to ensure the clarity of the information, it is necessary to further select the acquired extended keywords. There are various methods for selecting a target keyword from the extended keywords according to a type of the extended keywords and the similarity between the extended keywords and the self-defined keyword. In one embodiment, firstly, all the extended keywords that have been acquired are classified. Then, the top h extended keywords having the highest similarity with the self-defined keyword are selected from each type as the target keyword, and h is a positive integer greater than 0. The target keywords selected from each type are aggregated, and the target keyword list for monitoring is generated. In another embodiment, firstly, the types corresponding to all extended words are obtained, and then the keywords of the same type are grouped in a group. The number of the extended words corresponding to each type of extended keywords is acquired. According to the type with the smallest number of extended words, assuming that the number of the extended words corresponding to the type with the smallest number of extended words is X, and X extended keywords are also selected as target keywords from each of the other types, and the X extended keywords is selected from each of the other types according to the similarity. The top X extended keywords having the highest similarity are selected from each of the other types of the extended keywords as the target keywords, and the target keywords are added to a target keyword list.

Step 308: perform real-time monitoring according to the target keyword in the target keyword list.

In the present embodiment, after the target keyword list is determined, real-time monitoring is performed according to the target keyword in the target keyword list. Since the social media data is being produced all the time, and the data is produced rapidly and in a large-scale, thereby a huge network data stream is formed. In order to better monitor the topic, a timing management framework based on a sliding window may be used. The main idea of the timing management framework based on the sliding window is that for each target keyword in the target monitoring list, the topic data stream is managed in a form of sliding window, and each target keyword maintains a cache of a certain size. Every time a time slice (to monitor in real time, the time slice is usually set as a very small slice, such as 5 minutes) passes, the data window is slid, and then the data in the cache is processed.

Step 310: perform topic early warning when it is monitored that the number of topics corresponding to the target keyword reaches a preset threshold.

In the present embodiment, a good monitoring requires an early warning necessarily, and the topic early warning is performed by monitoring whether the topic amount corresponding to the target keyword reaches the preset threshold. Early warning may be considered in two aspects. Firstly, monitor the number of topics within a preset time slice and perform the early warning. Since the time slice is a short time, it is possible to perform the early warning for a sudden event within a short period of time by monitoring the topic in the short period of time. Secondly, perform early warning for the topics within a period. Since the occurrence of events or the trend of public sentiment is not necessarily sharp in many cases, investigating hot topics during a period of time can help decision makers to discover the rise of events or the gradual development of public sentiments. Specifically, two kinds of evaluation strategies may be used to perform real-time early warning for the keywords. One is to use the heat of the topic to perform early warning. A critical threshold of the heat is determined empirically by analyzing a large number of the heat trends of the keywords and life cycles thereof. When the occurrence frequency of the target keyword in the sliding window is greater than the critical threshold of the heat, an early warning response is performed. The other one is to use an emotional polarity ratio to perform the early warning. Emotional polarity analysis is performed to the social network text related to the target keyword list that is monitored. The emotional polarity mainly includes three aspects, i.e. positive, neutral and negative. The early warning is performed when the ratio of the negative emotion to the topic amount corresponding to all of the target keywords is greater than the emotion polarity threshold. This method of topic early warning can be applied in many fields, especially in the financial field. The application of financial products is taken as an example to illustrate the benefits of the topic early warning. Firstly, the Internet and the financial industry are closely related. The financial products may avoid a lot of losses according to the monitoring of Internet data. Secondly, financial related keywords are relatively regular and relatively fixed. Through monitoring topics related to financial products and performing early warning, rapid response can be achieved without losing accuracy.

In the present embodiment, the extended keywords related to the user self-defined keyword are acquired by acquiring the user self-defined keyword and then extending the self-defined keyword in the corpus according to the similarity. Then the target keywords that are finally used for monitoring are selected according to the type of the extended keywords and the similarity. Real-time monitoring is then performed on the social media according to the target keyword. When it is monitored that the number of topics of the target keyword reaches the preset threshold, the topic early warning is performed. This method can not only perform monitoring to the topic in real time, but also can perform monitoring purposely based on user self-defined keywords, which meets the needs of the user's personalized monitoring and early warning. Through extending and selecting the self-defined keyword that the user wants to monitor, the monitoring diversity and comprehensiveness are ensured.

Figure 4:
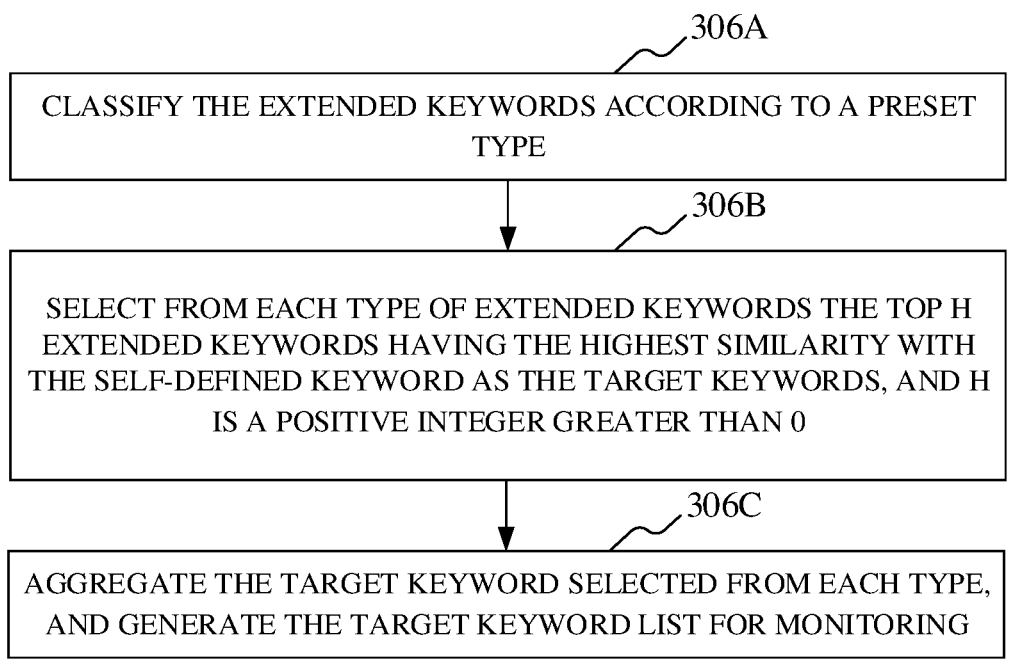
FIG. 4 is a flow diagram illustrating a method for selecting a target keyword from extended keywords according to a type of the extended keywords and similarity between the extended keywords and a self-defined keyword according to one embodiment.

As shown in FIG. 4, in one embodiment, the step of selecting a target keyword from the extended keywords in accordance with a type of the extended keywords and similarity between the extended keywords and the self-defined keyword, and adding the target keyword to a target keyword list includes:

Step 306A: classify the extended keywords according to a preset type.

In the present embodiment, in order to make the monitoring that is based on the self-defined keyword more comprehensive and balanced, firstly, it is necessary to classify the extended keywords in accordance with a preset type. For example, the extended keywords are classified into three types in accordance with "brand", "product", and "competitive product". In this way, it is convenient for monitoring the same number of the target keywords selected from each type subsequently, which is conducive to ensuring the monitoring information is clear, comprehensive and balanced.

Step 306B: select from each type of extended keywords the top h extended keywords having the highest similarity with the self-defined keyword as the target keywords, and h is a positive integer greater than 0.

In the present embodiment, after the extended keywords are classified in accordance with the preset type, the top h extended keywords having the highest similarity with the self-defined keywords are selected from each type of extended keywords as the target keywords by using the crowd-sourcing strategy. For example, the top 5 words having the highest similarity with the self-defined keyword are selected from each type, and finally, the target keywords selected from each type are aggregated.

Step 306C: aggregate the target keyword selected from each type, and generate the target keyword list for monitoring.

In the present embodiment, after the top h extended keywords having the highest similarity with the self-defined keyword are selected from each type of extended keywords as the target keyword, aggregate the target keywords selected from each type, and put them in a same list, and the target keyword list is generated. In this way, it is convenient to perform real-time monitoring according to the target keyword in the target keyword list subsequently. For example, if the extended keywords are classified into three types in accordance with "brand", "product", and "competitive product", and 5 target words are selected from each type, then a total of 15 target keywords would be selected for monitoring. Through classifying the extended keywords and selecting the target keywords for each type, the monitoring content would be more clear and comprehensive, and the result would not be biased.

Figure 5:
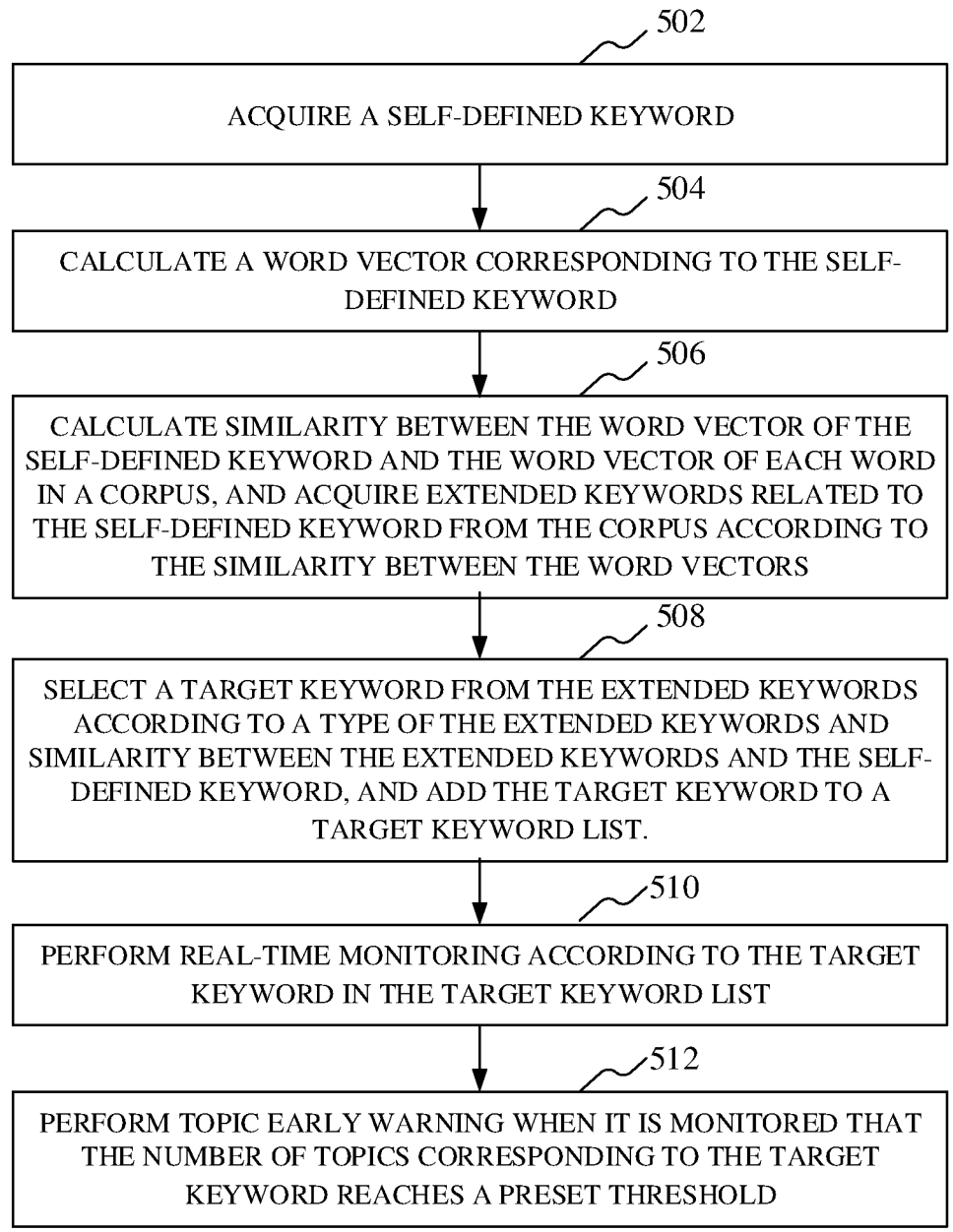
FIG. 5 is a flow diagram illustrating a method for topic early warning according to another embodiment.

As shown in FIG. 5, in one embodiment, a method for topic early warning is provided. The method includes:

Step 502: acquire a self-defined keyword.

Step 504: calculate a word vector corresponding to the self-defined keyword.

Step 506: calculate similarity between the word vector of the self-defined keyword and the word vector of each word in a corpus, and acquire extended keywords related to the self-defined keyword from the corpus according to the similarity between the word vectors.

Step 508: select a target keyword from the extended keywords according to a type of the extended keywords and similarity between the extended keywords and the self-defined keyword, and add the target keyword to a target keyword list.

Step 510: perform real-time monitoring according to the target keyword in the target keyword list.

Step 512: perform topic early warning when it is monitored that the number of topics corresponding to the target keyword reaches a preset threshold.

In the present embodiment, after acquiring the self-defined keyword, in order to calculate the similarity between word vectors subsequently, firstly, it is necessary to calculate a word vector corresponding to the self-defined keyword. Through using the self-defined keyword as an input of the word2vec model, the word vector corresponding to the self-defined keyword is generated and is output. In order to monitor more comprehensively, it is necessary to extend the self-defined keyword, that is, to find out related word expressions similar to the semantics of the self-defined keyword. The extended keywords related to the self-defined keyword are acquired by calculating the similarity between the self-defined keyword and each word in the corpus. The higher the similarity, the closer the semantic between extended keyword and self-defined keyword is. Specifically, the similarity between the word vector of the self-defined keyword and the word vector of each word in the corpus may be calculated by using the Pearson Correlation Coefficient method. The top K (for example, set K=50) words having the highest similarity with the self-defined keyword are selected from the corpus as the extended keywords. If all of the extended keywords that are selected are monitored, the information will be redundant and disorderly. In order to solve this problem, it is necessary to further select the extended keywords that are selected. The extended keywords are further selected based on the crowd-sourcing strategy. Firstly, the selected extended keywords are classified. For example, the extended keywords that are selected are classified into three types in accordance with "brand", "product", and "competition". After being classified, the top h extended keywords having the highest similarity with the self-defined keyword are selected from each type of extended keywords as the target keyword according to the similarity between each extended keyword and the self-defined keyword calculated before. Then, the target keywords selected from each type are aggregated, and are put in a same list, that is, the target keywords are added to the target keyword list. After that, monitoring is performed according to the target keyword list, and the corresponding early warning is performed. Through extending the user self-defined keyword, the method ensures the monitoring diversity and comprehensiveness. Combing the crowd sourcing technology to further select the extended keywords ensures that the monitoring result would not be biased.

Figure 6:
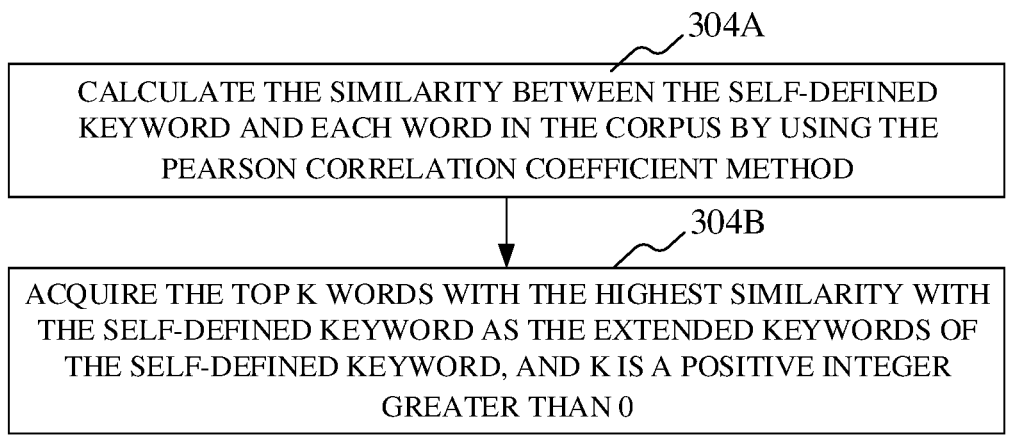
FIG. 6 is a flow diagram illustrating a method for calculating similarity between a self-defined keyword and each word in a corpus, and acquiring extended keywords from the corpus according to the similarity according to one embodiment.

As shown in FIG. 6, in one embodiment, calculating similarity between the self-defined keyword and each word in a corpus, and acquiring extended keywords related to the self-defined keyword from the corpus according to the similarity includes:

step 304A: calculate the similarity between the self-defined keyword and each word in the corpus by using the Pearson Correlation Coefficient method.

In the present embodiment, in order to extend the self-defined keyword and find out the extended keywords with similar semantic to the self-defined keyword, the similarity between the self-defined keyword and each word in the corpus is calculated by using the Pearson Correlation Coefficient method. The greater the similarity, the more similar the semantic is. Specifically, firstly, acquire the word vector representation of the self-defined keyword, and the word vector representation of the self-defined keyword may be calculated by using the word2vec method. Then calculate the similarity between the word vector of the self-defined keyword and the word vector of each word in a corpus. In order to calculate the similarity between the self-defined keyword and the words in the corpus more quickly, the words in the corpus may exist in the form of word vectors. Assuming that the word vector of the self-defined keyword is represented as $W=(w_1, w_2, L, w_n)$, and the word vector of any one of the words in the corpus is represented as $X=(x_1, x_2, L, x_n)$, the similarity $s(W, X)$ between them is:

$$s(W, X) = \frac{n\sum_{i=1}^{n} w_i x_i - \sum_{i=1}^{n} w_i \sum_{i=1}^{n} x_i}{\sqrt{n\sum_{i=1}^{n} w_i^2 - (\sum_{i=1}^{n} w_i)^2} \cdot \sqrt{n\sum_{i=1}^{n} x_i^2 - (\sum_{i=1}^{n} x_i)^2}}.$$

Step 304B: acquire the top K words having the highest similarity with the self-defined keyword as the extended keywords of the self-defined keyword, and K is a positive integer greater than 0.

In the present embodiment, obviously, it is impractical to extend the self-defined keyword indefinitely, so it is necessary to select words with a high similarity from the corpus as the extended keywords. Specifically, the top K words having the highest similarity with the self-defined keyword are selected as an expansion of the self-defined keyword by using the greedy strategy. The set of the extended keywords are set as $ES(W)$, and $ES(W)=\{X|s(W, X) \geq s(W, X_k)\}$. Among them, W represents the self-defined keyword, and $X_k$, represents a word with a K-th similarity with the self-defined keyword. For example, it may be set that K=50, that is, the top 50 words having the highest similarity with the self-defined keyword are selected as the set of extended keywords for the self-defined keyword.

In one embodiment, the step of performing real-time monitoring according to the target keyword in the target keyword list includes: performing real-time monitoring for each target keyword in the target keyword list in a form of a sliding window.

In the present embodiment, since the data of social media is being produced all the time, and the data is produced rapidly and in a large scale, in order to achieve the real-time monitoring of the topic, it is necessary to solve how to perform real-time monitoring of the topic in the data stream environment. In the present embodiment, real-time monitoring of each target keyword in the target keyword column is performed by using a form based on a sliding window. That is, the topic data stream is managed in the form of the sliding window. Each target keyword maintains a buffer of a certain size. Every time a time slice passes, the data window is slid, and then the data in the cache is processed, so that real-time monitoring for each target keyword is realized.

Figure 7:
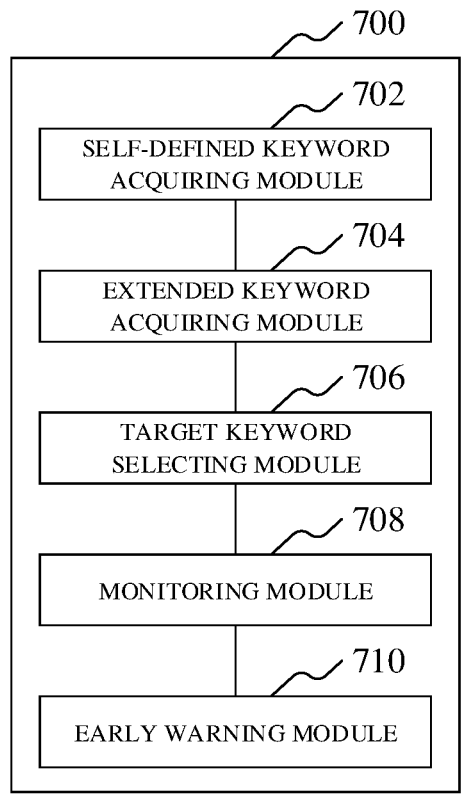
FIG. 7 is a block diagram illustrating structure of an apparatus for topic early warning according to one embodiment.

As shown in FIG. 7, in one embodiment, an apparatus 700 for topic early warning is provided. The apparatus includes:

a self-defined keyword acquiring module 702, configured to acquire a self-defined keyword;

an extended keyword acquiring module 704, configured to calculate similarity between the self-defined keyword and each word in a corpus, and acquire extended keywords related to the self-defined keyword from the corpus according to the similarity;

a target keyword selecting module 706, configured to select a target keyword from the extended keywords according to a type of the extended keywords and similarity between the extended keywords and the self-defined keyword, and add the target keyword to a target keyword list;

a monitoring module 708, configured to perform real-time monitoring according to the target keyword in the target keyword list; and an early warning module 710, configured to perform topic early warning when it is monitored that the number of topics corresponding to the target keyword reaches a preset threshold.

Figure 8:
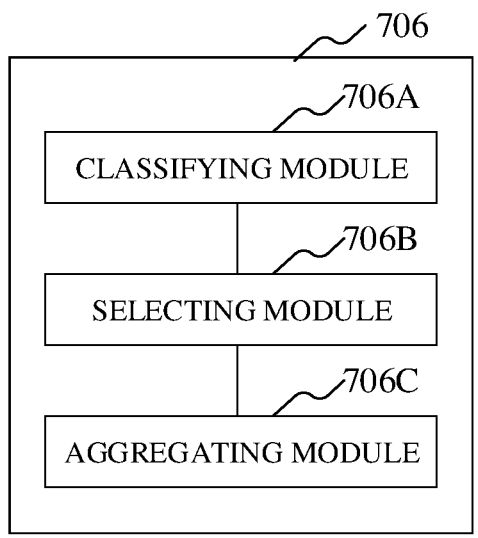
FIG. 8 is a block diagram illustrating structure of a target keyword selecting module according to one embodiment.

As shown in FIG. 8, in one embodiment, the target keyword selecting module 706 includes:

a classifying module 706A, configured to classify the extended keywords in accordance with a preset type;

a selecting module 706B, configured to select top h extended keywords having the highest similarity with the self-defined keyword from each type of extended keywords as the target keyword, and h is a positive integer greater than 0;

an aggregating module 706C, configured to aggregate the target keyword selected from each type, and generate the target keyword list for monitoring.

Figure 9:
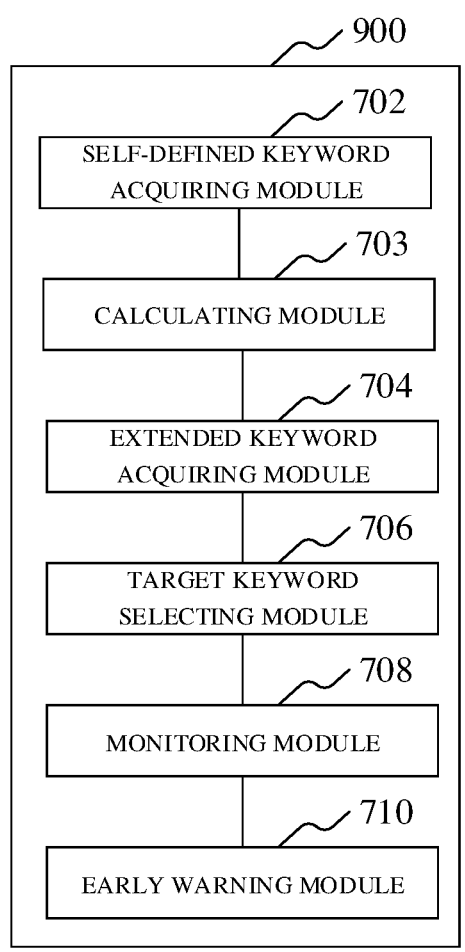
FIG. 9 is a block diagram illustrating structure of an apparatus for topic early warning according to one embodiment.

As shown in FIG. 9, in one embodiment, an apparatus 900 for topic early warning is provided. In addition to the above modules 702-710, the apparatus 900 further includes:

a calculating module 703, configured to calculate a word vector corresponding to the self-defined keyword.

The extended keyword acquiring module 704 is further configured to calculate similarity between the word vector of the self-defined keyword and word vectors of each word in the corpus, and acquire the extended keywords related to the self-defined keyword from the corpus according to the similarity between the word vectors.

In one embodiment, the extended keyword acquiring module is further configured to calculate the similarity between the self-defined keyword and each word in the corpus by using the Pearson Correlation Coefficient method, and acquire the top K words having the highest similarity with the self-defined keyword as the extended keywords of the self-defined keyword, wherein K is a positive integer greater than 0.

In one embodiment, the early warning module is further configured to perform real-time monitoring for each target keyword in the target keyword list in a form of a sliding window.

Each module in the apparatus for topic early warning mentioned above may be implemented in full or in part by software, hardware, and a combination thereof. Among them, the network interface may be an Ethernet card or a wireless network card. Each of the above modules may be embedded in or independent of the processor in the server in a form of hardware, or may be stored in the memory in the server in a form of software, so that the processor calls the modules to perform the operations corresponding to the above modules. The processor may be a central processing unit (CPU), a microprocessor, a microcontroller or the like.

A person skilled in the art should understand that all or part of the process for implementing the methods of the above embodiments can be completed by a computer program instructing a related hardware. The computer program may be stored in a computer-readable storage medium. The computer program may include the processes in the embodiments of the various methods when it is being executed. The foregoing storage medium may be a non-volatile storage medium such as a magnetic disk, an optical disk, a read-only memory (ROM), or a random access memory (RAM) or the like.

The technical features of the above-described embodiments may be combined arbitrarily. To make the description concise, all the possible combinations of the technical features in the above embodiments are not described. However, as long as there is no contradiction in the combination of these technical features, it should be considered as the scope of the present specification.

The foregoing implementations are merely specific embodiments of the present disclosure, and are not intended to limit the protection scope of the present disclosure. It should be noted that any modifications, equivalent alternations and improvements that are made within the spirit and scope of the present disclosure should be included in the protection scope of the present disclosure. Therefore, the protection scope of the present disclosure shall be subject to the protection scope of the claims.

What is claimed is:

1. A method for topic early warning, the method comprising:
    acquiring a user-defined keyword;
    calculating similarity between the user-defined keyword and each word in a corpus;
    acquiring extended keywords related to the user-defined keyword from the corpus according to the similarity;
    selecting one or more target keywords from the extended keywords according to a type of the extended keywords and similarity between the extended keywords and the user-defined keyword, and adding the target keyword to a target keyword list;
    performing real-time monitoring according to the target keyword in the target keyword list; and
    performing topic early warning when the real-time monitoring indicates that the number of topics corresponding to the target keyword reaches a preset threshold;
    wherein performing topic early warning comprises: performing emotional polarity analysis to a social network text related to the target keyword list that is monitored, emotional polarity comprising positive emotion, neutral emotion and negative emotion, and performing the topic early warning when a ratio of the negative emotion to topic amount corresponding to all of the target keywords is greater than an emotion polarity threshold; and
    wherein the act of calculating similarity between the user-defined keyword and each word in a corpus, and acquiring extended keywords related to the user-defined keyword from the corpus according to the similarity comprises:
        selecting the top K words having the highest similarity with the user-defined keyword as an expansion of the user-defined keyword by using a greedy strategy;
        wherein a set of the extended keywords is ES(W), and ES(W)=$\{X | s(W, X) \geq s(W, X_k)\}$
        where $s(W, X)$ represents similarity, W represents the user-defined keyword, $X_k$ represents a word with a K-th similarity with the user-defined keyword, and K=50.

2. The method of claim 1, wherein the selecting a target keyword from the extended keywords according to a type of the extended keywords and similarity between the extended keywords and the user-defined keyword, and adding the target keyword to a target keyword list comprises:
    classifying the extended keywords in accordance with a preset type;
    selecting, from each type of extended keywords, top h extended keywords having the highest similarity with the user-defined keyword as the target keywords, wherein h is a positive integer greater than 0;
    aggregating the target keywords selected from each type, and generating the target keyword list for monitoring.

3. The method of claim 1, after the acquiring a user-defined keyword, comprising:
    calculating a word vector corresponding to the user-defined keyword;
    wherein the calculating similarity between the user-defined keyword and each word in a corpus, and acquiring extended keywords related to the user-defined keyword from the corpus according to the similarity comprises:
    calculating similarity between the word vector of the user-defined keyword and a word vector of each word in the corpus; and
    acquiring the extended keywords related to the user-defined keyword from the corpus according to the similarity between the word vectors.

4. The method of claim 1, wherein the calculating similarity between the user-defined keyword and each word in a corpus, and acquiring extended keywords related to the user-defined keyword from the corpus according to the similarity comprises:
    calculating the similarity between the user-defined keyword and each word in the corpus by using the Pearson Correlation Coefficient method; and
    acquiring top K words having the highest similarity with the user-defined keyword as the extended keywords of the user-defined keyword, wherein K is a positive integer greater than 0.

5. The method of claim 1, wherein the performing real-time monitoring according to the target keywords in the target keyword list comprises:
    performing real-time monitoring for each target keyword in the target keyword list in a form of a sliding window.

6. A computer equipment, comprising:
    a memory; and
    a processor;

wherein the memory stores computer-readable instructions, the computer-readable instructions being executed by the processor to cause the processor to execute following method:
acquiring a user-defined keyword;
calculating similarity between the user-defined keyword and each word in a corpus;
acquiring extended keywords related to the user-defined keyword from the corpus according to the similarity;
selecting one or more target keywords from the extended keywords according to a type of the extended keywords and similarity between the extended keywords and the user-defined keyword, and adding the target keywords to a target keyword list;
performing real-time monitoring according to the target keyword in the target keyword list; and
performing topic early warning when the real-time monitoring indicates that the number of topics corresponding to the target keyword reaches a preset threshold;
wherein performing topic early warning comprises: performing emotional polarity analysis to a social network text related to the target keyword list that is monitored, emotional polarity comprising positive emotion, neutral emotion and negative emotion, and performing the topic early warning when a ratio of the negative emotion to topic amount corresponding to all of the target keywords is greater than an emotion polarity threshold; and
wherein the act of calculating similarity between the user-defined keyword and each word in a corpus, and acquiring extended keywords related to the user-defined keyword from the corpus according to the similarity comprises:
selecting the top K words having the highest similarity with the user-defined keyword as an expansion of the user-defined keyword by using a greedy strategy;
wherein a set of the extended keywords is ES(W), and ES(W)=$\{X|s(W, X) \geq s(W, X_k)\}$
where s(W, X) represents similarity, W represents the user-defined keyword, $X_k$ represents a word with a K-th similarity with the user-defined keyword, and K=50.

7. The computer equipment of claim 6, wherein the step of selecting one or more target keywords from the extended keywords according to a type of the extended keywords and similarity between the extended keywords and the user-defined keyword, and adding the target keywords to a target keyword list, which is executed by the processor, comprises:
classifying the extended keywords in accordance with a preset type;
selecting top h extended keywords having the highest similarity with the user-defined keyword from each type of extended keywords as the target keywords, wherein h is a positive integer greater than 0;
aggregating the target keywords selected from each type; and
generating the target keyword list for monitoring.

8. The computer equipment of claim 6, wherein after the step of acquiring a user-defined keyword, the processor is further configured to execute following method:
calculating a word vector corresponding to the user-defined keyword;
wherein calculating similarity between the user-defined keyword and each word in a corpus, and acquiring extended keywords related to the user-defined keyword from the corpus according to the similarity comprises:
calculating similarity between the word vector of the user-defined keyword and a word vector of each word in the corpus; and
acquiring the extended keywords related to the user-defined keyword from the corpus according to the similarity between the word vectors.

9. The computer equipment of claim 6, wherein the step of calculating similarity between the user-defined keyword and each word in a corpus, and acquiring extended keywords related to the user-defined keyword from the corpus according to the similarity, which is executed by the processor, comprises:
calculating the similarity between the user-defined keyword and each word in the corpus by using the Pearson Correlation Coefficient method; and
acquiring top K words having the highest similarity with the user-defined keyword as the extended keywords of the defined keyword, wherein K is a positive integer greater than 0.

10. The computer equipment of claim 6, wherein the step of performing real-time monitoring according to the target keywords in the target keyword list, which is executed by the processor, comprises: performing real-time monitoring for each target keyword in the target keyword list in a form of a sliding window.

11. One or more non-transitory readable storage medium (s) storing computer-readable instructions which, when executed by one or more processors, cause the one or more processors to perform the following method:
acquiring a user-defined keyword;
calculating similarity between the user-defined keyword and each word in a corpus;
acquiring extended keywords related to the user-defined keyword from the corpus according to the similarity;
selecting one or more target keywords from the extended keywords according to a type of the extended keywords and similarity between the extended keywords and the user-defined keyword, and adding the target keywords to a target keyword list;
performing real-time monitoring according to the target keywords in the target keyword list; and
performing topic early warning when the real-time monitoring indicates that the number of topics corresponding to the target keywords reaches reach a preset threshold;
wherein performing topic early warning comprises: performing emotional polarity analysis to a social network text related to the target keyword list that is monitored, emotional polarity comprising positive emotion, neutral emotion and negative emotion, and performing the topic early warning when a ratio of the negative emotion to topic amount corresponding to all of the target keywords is greater than an emotion polarity threshold; and
wherein the act of calculating similarity between the user-defined keyword and each word in a corpus, and acquiring extended keywords related to the user-defined keyword from the corpus according to the similarity comprises:
selecting the top K words having the highest similarity with the user-defined keyword as an expansion of the user-defined keyword by using a greedy strategy;
wherein a set of the extended keywords is ES(W), and ES(W)=$\{X|s(W, X) \geq s(W, X_k)\}$ where s(W, X) represents similarity, W represents the user-defined keyword, $X_k$ represents a word with a K-th similarity with the user-defined keyword, and K=50.

12. The non-transitory readable storage medium of claim 11, wherein the step of selecting one or more target keywords from the extended keywords according to a type of the extended keywords and similarity between the extended keywords and the user-defined keyword, and adding the target keywords to a target keyword list, which is executed by the processor, comprises:
classifying the extended keywords in accordance with a preset type;
selecting, from each type of extended keywords, top h extended keywords having the highest similarity with the user-defined keyword as the target keywords, wherein h is a positive integer greater than 0;
aggregating the target keywords selected from each type; and
generating the target keyword list for monitoring.

13. The non-transitory readable storage medium of claim 11, wherein after the step of acquiring a user-defined keyword, the processor is further configured to execute following steps:
calculating a word vector corresponding to the user-defined keyword;
wherein calculating similarity between the user-defined keyword and each word in a corpus, and acquiring extended keywords related to the user-defined keyword from the corpus according to the similarity comprises:
calculating similarity between the word vector of the user-defined keyword and a word vector of each word in the corpus; and
acquiring the extended keywords related to the user-defined keyword from the corpus according to the similarity between the word vectors.

14. The non-transitory readable storage medium of claim 11, wherein the step of calculating similarity between the user-defined keyword and each word in a corpus, and acquiring extended keywords related to the user-defined keyword from the corpus according to the similarity, which is executed by the processor, comprises:
calculating the similarity between the user-defined keyword and each word in the corpus by using the Pearson Correlation Coefficient method; and
acquiring top K words having the highest similarity with the user-defined keyword as the extended keywords of the user-defined keyword, wherein K is a positive integer greater than 0.

15. The non-transitory readable storage medium of claim 11, wherein the step of performing real-time monitoring according to the target keywords in the target keyword list, which is executed by the processor, comprises: performing real-time monitoring for each target keyword in the target keyword list in a form of a sliding window.

* * * * *